US012574997B2

(12) United States Patent
Li

(10) Patent No.: US 12,574,997 B2
(45) Date of Patent: Mar. 10, 2026

(54) TERMINAL CONTROL METHOD, INFORMATION PROCESSING METHOD, COMMUNICATION DEVICE, AND STORAGE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 315 days.

(21) Appl. No.: 18/269,204

(22) PCT Filed: Dec. 25, 2020

(86) PCT No.: PCT/CN2020/139351
§ 371 (c)(1),
(2) Date: Jun. 22, 2023

(87) PCT Pub. No.: WO2022/133992
PCT Pub. Date: Jun. 30, 2022

(65) Prior Publication Data
US 2024/0057210 A1 Feb. 15, 2024

(51) Int. Cl.
*H04W 76/28* (2018.01)
*H04W 48/16* (2009.01)
*H04W 68/00* (2009.01)

(52) U.S. Cl.
CPC .......... *H04W 76/28* (2018.02); *H04W 48/16* (2013.01); *H04W 68/00* (2013.01)

(58) Field of Classification Search
CPC . H04W 48/12; H04W 48/16; H04W 52/0216; H04W 52/0229; H04W 52/0235; H04W 52/028; H04W 68/00; H04W 68/005; H04W 76/27; H04W 76/28; Y02D 30/70
See application file for complete search history.

(56) References Cited

U.S. PATENT DOCUMENTS

| | | | | |
|---|---|---|---|---|
| 2018/0249409 A1* | 8/2018 | Cho | .................. | H04L 67/12 |
| 2019/0349858 A1* | 11/2019 | Jantzi | .................. | H04W 76/28 |
| 2021/0360734 A1* | 11/2021 | Wang | .................. | H04W 76/28 |
| 2022/0053517 A1* | 2/2022 | Kim | .................. | H04L 1/1812 |
| 2022/0078872 A1* | 3/2022 | Shrestha | .............. | H04W 68/12 |

(Continued)

FOREIGN PATENT DOCUMENTS

| | | |
|---|---|---|
| CN | 111107594 A | 5/2020 |
| WO | WO 2019137341 A1 | 7/2019 |
| WO | WO 2020166957 A1 | 8/2020 |

OTHER PUBLICATIONS

European Patent Application No. 20966557.9, Search and Opinion dated Feb. 26, 2024, 9 pages.

(Continued)

*Primary Examiner* — Kashif Siddiqui
(74) *Attorney, Agent, or Firm* — Cozen O'Connor

(57) ABSTRACT
A terminal control method includes: receiving a first indication carried in a broadcast message. The first indication at least indicates whether an access device supports an extended discontinuous reception (eDRX) function in an inactive state, and the broadcast message comprises a system information block (SIB).

17 Claims, 6 Drawing Sheets

(56) References Cited

U.S. PATENT DOCUMENTS

| | | | | |
|---|---|---|---|---|
| 2023/0199902 A1* | 6/2023 | Vogedes | ............... | H04W 68/00 |
| | | | | 455/458 |
| 2023/0224861 A1* | 7/2023 | Ai | ........................ | H04W 68/02 |
| | | | | 370/329 |

OTHER PUBLICATIONS

PCT/CN2020/139351, English translation of International Search Report dated Jul. 27, 2021, 2 pages.
Qualcomm Incorporated "Access stratum changes to support eDRX for eMTC connected 5GC in RRC_INACTIVE state", 3GPP TSG-RAN WG2 Meeting #107bis, R2-1912850, Oct. 2019, 3 pages.
CATT "On eDRX for NR RRC Inactive and Idle", 3GPP TSG-RAN WG2 Meeting #112 electronic, R2-2009363, Nov. 2020, 3 pages.

* cited by examiner eDRX period

|◄PTW►|

DRX
period

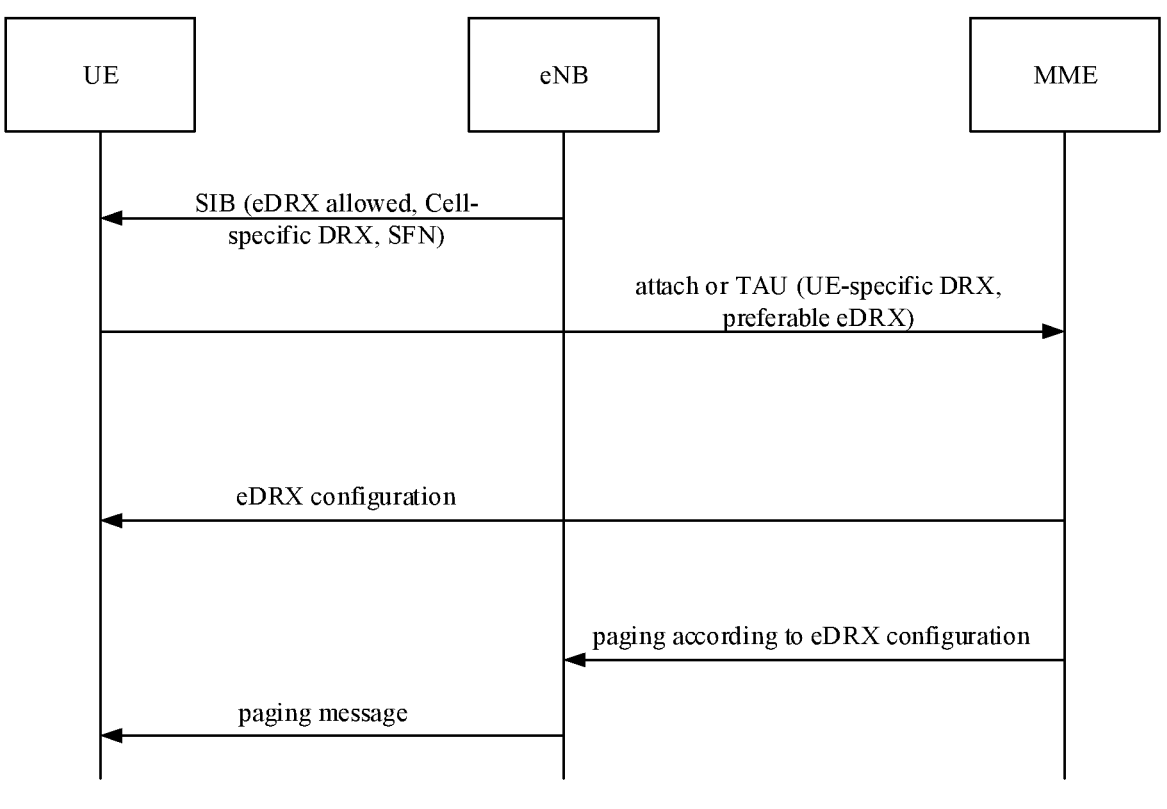

FIG. 3

S110: performing an eDRX function in an inactive state according to a first eDRX parameter

FIG. 4

S210: determining whether an access network to which the terminal is connected supports the eDRX function

FIG. 5

S311: monitoring a paging channel in the inactive state according to the first eDRX parameter and/or the second eDRX parameter of the idle state

FIG. 6A

S312: determining that the terminal enables the eDRX function in the idle state and the eDRX function in the inactive state, in response to the terminal having enabled the eDRX function in the inactive state

FIG. 6B

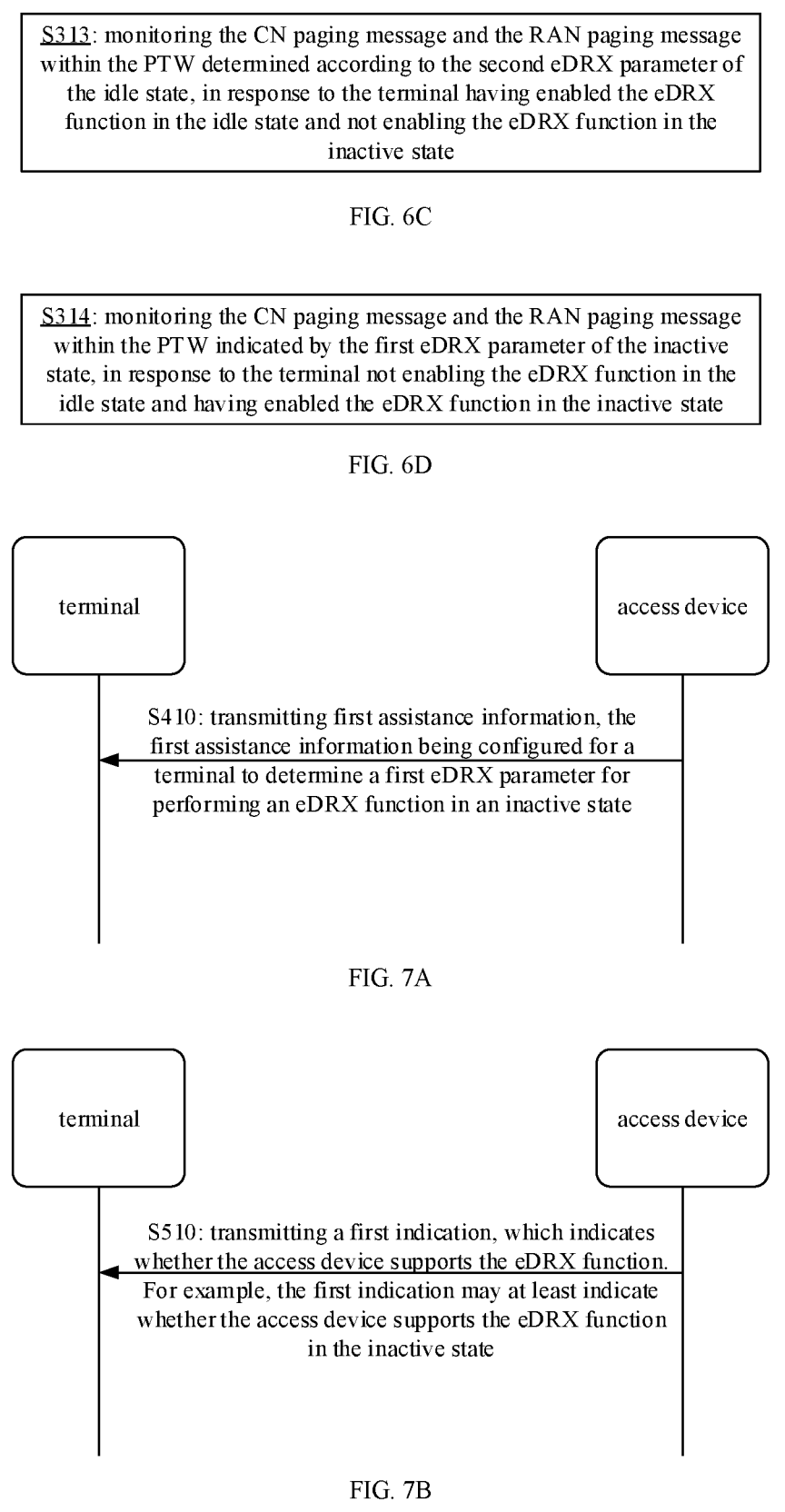

S313: monitoring the CN paging message and the RAN paging message within the PTW determined according to the second eDRX parameter of the idle state, in response to the terminal having enabled the eDRX function in the idle state and not enabling the eDRX function in the inactive state

FIG. 6C

S314: monitoring the CN paging message and the RAN paging message within the PTW indicated by the first eDRX parameter of the inactive state, in response to the terminal not enabling the eDRX function in the idle state and having enabled the eDRX function in the inactive state

FIG. 6D terminal                                              access device

S410: transmitting first assistance information, the first assistance information being configured for a terminal to determine a first eDRX parameter for performing an eDRX function in an inactive state

FIG. 7A terminal                                              access device

S510: transmitting a first indication, which indicates whether the access device supports the eDRX function. For example, the first indication may at least indicate whether the access device supports the eDRX function in the inactive state

FIG. 7B terminal control apparatus performing module 110

FIG. 9 information processing apparatus first transmitting module 210

FIG. 10 information processing apparatus second transmitting module 310

FIG. 11

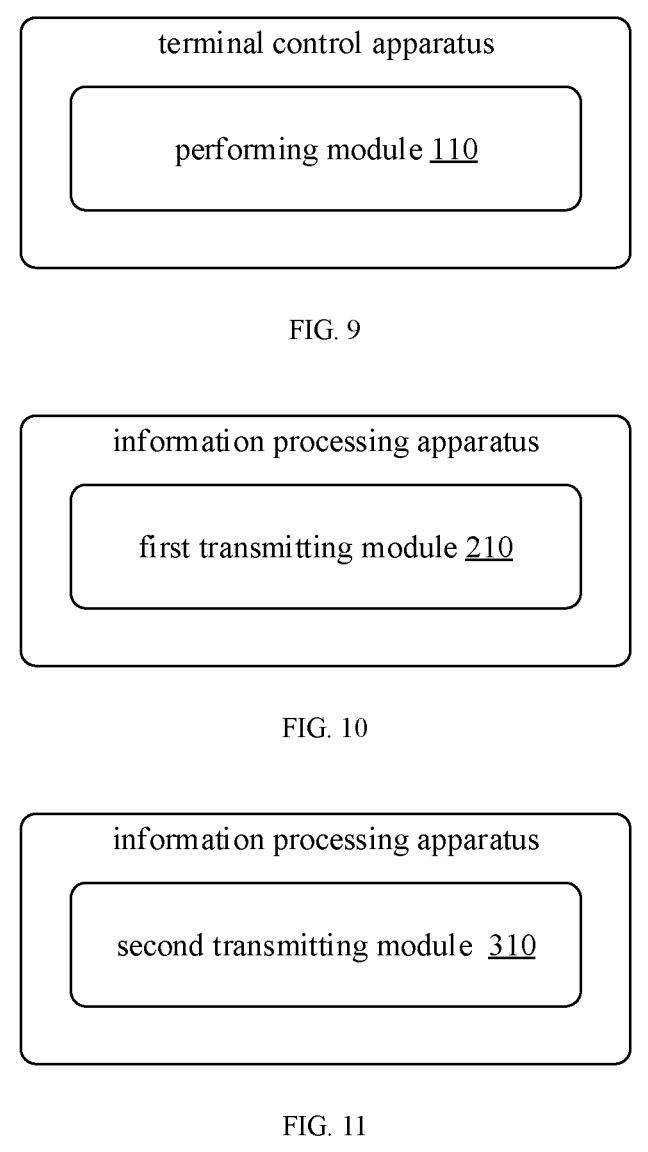

TERMINAL CONTROL METHOD, INFORMATION PROCESSING METHOD, COMMUNICATION DEVICE, AND STORAGE MEDIUM

CROSS-REFERENCE TO RELATED APPLICATION

This Application is a U.S. National Stage Application of International Application No. PCT/CN2020/139351, filed Dec. 25, 2020, the entire contents of which are incorporated herein by reference.

TECHNICAL FIELD

The present disclosure relates to, but is not limited to, the field of wireless communication technologies, and more particularly, to a terminal control method and apparatus, an information processing method and apparatus, a communication device and a storage medium.

BACKGROUND

Terminal equipment should take into account both low power consumption and delay of services that have certain requirements for the delay. In each extended discontinuous reception (eDRX) period, the terminal can receive downlink data only within the set paging time window (PTW), and in other time, the terminal is in a dormant state and do not receive the downlink data. This mode can achieve a balance between the delay of downlink services (such as a remote gas shutdown service) and the power consumption.

There is a PTW in each eDRX period, the terminal monitors a paging channel according to a discontinuous reception (DRX) period in the PTW to receive the downlink data, and in other time, the terminal is in the dormant state.

SUMMARY

Embodiments of the present disclosure provide a terminal control method and apparatus, an information processing method and apparatus, a communication device, and a storage medium.

A first aspect of embodiments of the present disclosure provides a terminal control method, which is performed by a terminal and includes: receiving a first indication carried in a broadcast message, wherein the first indication at least indicates whether an access device supports an extended discontinuous reception (eDRX) function in an inactive state.

A second aspect of embodiments of the present disclosure provides an information processing method, which is performed by an access device of an access network and includes: transmitting a first indication in a broadcast message carrying the first indication. The first indication indicates whether the access device supports a terminal to start an extended discontinuous reception (eDRX) function in an inactive state. The wherein the broadcast message comprises a system information block (SIB)

A third aspect of embodiments of the present disclosure provides an information processing method, which is performed by a core network device of a core network and includes: transmitting second assistance information. The second assistance information is configured for an access device to determine first assistance information to be provided by an access network to a terminal.

A fourth aspect of embodiments of the present disclosure provides a communication device, which includes: a processor, a transceiver, a memory, and an executable program stored on the memory and runnable by the processor. The processor is configured to execute the method as provided in the first aspect as described above when the processor runs the executable program.

A fifth aspect of embodiments of the present disclosure provides a communication device, which includes: a processor, a transceiver, a memory, and an executable program stored on the memory and runnable by the processor. The processor is configured to execute the method as provided in the second aspect as described above when the processor runs the executable program.

A sixth aspect of embodiments of the present disclosure provides a communication device, which includes: a processor, a transceiver, a memory, and an executable program stored on the memory and runnable by the processor. The processor is configured to execute the method as provided in the third aspect as described above when the processor runs the executable program.

A seventh aspect of embodiments of the present disclosure provides a computer storage medium having stored therein an executable program that, when executed by a processor, cause the method as provided in the first aspect as described above to be implemented.

An eighth aspect of embodiments of the present disclosure provides a computer storage medium having stored therein an executable program that, when executed by a processor, cause the method as provided in the second aspect as described above to be implemented.

A ninth aspect of embodiments of the present disclosure provides a computer storage medium having stored therein an executable program that, when executed by a processor, cause the method as provided in the third aspect as described above to be implemented.

It is to be understood that both the foregoing general description and the following detailed description are illustrative and explanatory only and are not restrictive of embodiments of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of embodiments of the present disclosure.

FIG. 3 is a schematic diagram showing interactions when a core network configures an eDRX function in an idle state, according to an illustrative embodiment;

FIG. 4 is a schematic flowchart showing a terminal control method, according to an illustrative embodiment;

FIG. 5 is a schematic flowchart showing a terminal control method, according to an illustrative embodiment;

FIG. 6A is a schematic flowchart showing a terminal control method, according to an illustrative embodiment;

FIG. 6B is a schematic flowchart showing a terminal control method, according to an illustrative embodiment;

FIG. 6C is a schematic flowchart showing a terminal control method, according to an illustrative embodiment;

FIG. 6D is a schematic flowchart showing a terminal control method, according to an illustrative embodiment;

FIG. 7A is a schematic flowchart showing an information processing method, according to an illustrative embodiment;

FIG. 7B is a schematic flowchart showing an information processing method, according to an illustrative embodiment;

FIG. 9 is a schematic diagram showing a terminal control apparatus, according to an illustrative embodiment;

FIG. 10 is a schematic diagram showing an information processing apparatus, according to an illustrative embodiment;

FIG. 11 is a schematic diagram showing an information processing apparatus, according to an illustrative embodiment;

DETAILED DESCRIPTION

Illustrative embodiments will be described in detail below, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with embodiments of the present disclosure. Instead, they are merely examples of apparatuses and methods consistent with some aspects of embodiments of the present disclosure as recited in the appended claims.

Terms used in embodiments of the present disclosure are only for the purpose of describing specific embodiments, but should not be construed to limit embodiments of the present disclosure. As used in embodiments of the present disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

Figures 1, 2:
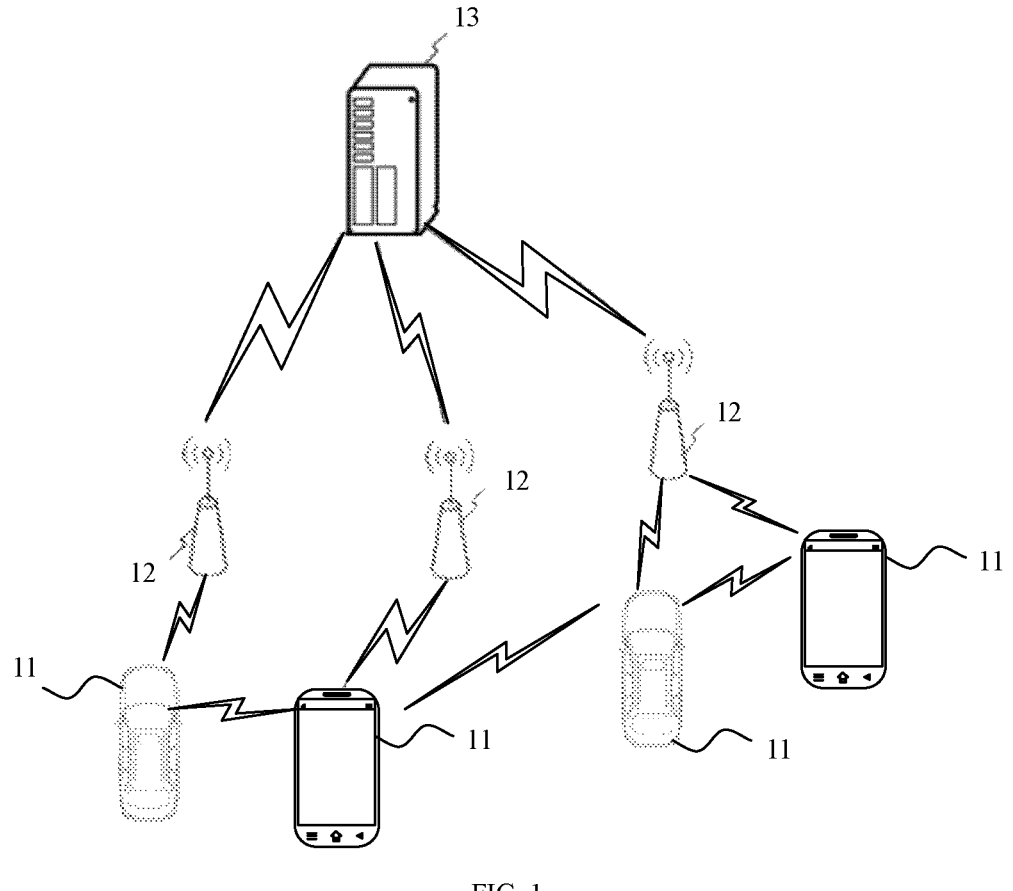
FIG. 1 is a schematic diagram showing a wireless communication system, according to an illustrative embodiment.
FIG. 2 is a schematic timing diagram for performing an eDRX function, according to an illustrative embodiment.

Referring to FIG. 1, which shows a schematic diagram of a wireless communication system provided by an embodiment of the present disclosure. As shown in FIG. 1, the wireless communication system is a communication system based on a cellular mobile communication technology, and may include several UEs 11 and several access devices 12.

The UE 11 may refer to a device that provides voice and/or data connectivity to a user. The UE 11 can communicate with one or more core networks via a radio access network (RAN). The UE 11 may be an Internet of Things UE, such as a sensor device, a mobile phone (or referred to as a "cellular" phone) and a computer with an Internet of Things UE. For example, the UE 11 may be a fixed, portable, pocket-sized, handheld, built-in computer or vehicle-mounted apparatus, such as a station (STA), a subscriber unit, a subscriber station, a mobile station, a mobile, a remote station, an access point, a remote terminal, an access terminal, a user terminal, a user agent, a user device, or a user equipment (UE). Alternatively, the UE 11 may be a device of an unmanned aerial vehicle. Alternatively, the UE 11 may be a vehicle-mounted device, for example, a vehicle-mounted computer with a wireless communication function, or a wireless communication device externally connected with a vehicle-mounted computer. Alternatively, the UE 11 may be a roadside device, such as a street lamp, a signal lamp or other roadside devices with a wireless communication function.

The access device 12 may be a network side device in the wireless communication system. The wireless communication system may be a 4th generation mobile communication (4G) system, also referred to as a long term evolution (LTE) system. Alternatively, the wireless communication system may be a 5G system, also referred to as a new radio (NR) system or a 5G NR system. Alternatively, the wireless communication system may be a next generation system of the 5G system. The access network in the 5G system may be referred to as a new generation-radio access network (NG-RAN), or a MTC system.

The access device 12 may be an evolved access device (eNB) used in the 4G system. Alternatively, the access device 12 may be a centralized distributed architecture access device (gNB) used in the 5G system. When the access device 12 adopts the centralized distributed architecture, it usually includes a central unit (CU) and at least two distributed units (DUs). The centralized unit is provided with a protocol stack of a packet data convergence protocol (PDCP) layer, a radio link control (RLC) layer and a media access control (MAC) layer. The distributed unit is provided with a protocol stack of a physical (PHY) layer. The specific implementation of the access device 12 is not limited in embodiments of the present disclosure.

A wireless connection may be established between the access device 12 and the UE 11 through a wireless radio. In different implementations, the wireless radio may be a wireless radio based on the 4th generation mobile communication network technology (4G) standard, or a wireless radio based on the 5th generation mobile communication network technology (5G) standard, such as a new radio, or a wireless radio based on the next generation mobile communication network technology standard of the 5G.

In some embodiments, an end to end (E2E) connection may also be established between the UEs 11, for example, a vehicle to vehicle (V2V) communication, a vehicle to infrastructure (V2I) communication and a vehicle to pedestrian (V2P) communication in a vehicle to everything (V2X) communication.

In some embodiments, the above wireless communication system may further include a network management device 13.

Several access devices 12 are each connected to the network management device 13. The network management device 13 may be a core network device in the wireless communication system, for example, the network management device 13 may be a mobility management entity (MME) in an evolved packet core (EPC). Alternatively, the network management device may be other core network devices, such as a serving gateway (SGW), a public data network gateway (PGW), a policy and charging rules function (PCRF) unit or a home subscriber server (HSS). The implementation form of the network management device 13 is not limited in embodiments of the present disclosure.

When a terminal starts an eDRX function, it will enter an eDRX mode. The terminal in the eDRX mode has the features that terminal equipment is accessible at any time, but the delay is relatively large, and the delay depends on an eDRX period configuration.

In this way, the terminal that starts the eDRX function achieves a balance between the power consumption of the terminal and the timeliness of data transmission to the maximum extent.

The eDRX function has one or more of the following eDRX parameters:

a starting time domain position of a PTW;

a length of the PTW;

an eDRX period, which may be represented by $T_{eDRX,H}$.

FIG. 2 shows a timing diagram after the terminal starts the eDRX function.

Referring to FIG. 2, as can be seen, there is a PTW in an eDRX period; and there are one or more DRX periods in the PTW.

A duration of the DRX period may be much less than a duration of the eDRX period.

FIG. 3 shows interactions between a UE (i.e., a terminal) and a core network for one of eDRX parameters of the eDRX function.

The eDRX parameter interaction method between the UE and the core network as shown in FIG. 3 may include the following operations.

An eNB transmits an indication of an allowed eDRX function, a cell-specific DRX indication, and a hyper system frame number (SFN) to the UE through a system information block (SIB).

The UE transmits a UE-specific DRX parameter (UE-specific DRX) and/or a preferable DRX parameter (preferable eDRX) in an attach request or a tracking area update (TAU) request.

After receiving the above attach request or TAU request, an EME transmits an eDRX configuration to the UE; the eDRX configuration carries the aforementioned one or more eDRX parameters.

The MME performs paging according to the eDRX configuration.

After receiving a CN paging message transmitted by the MIME, the eNB forwards the CN paging message to the UE.

The eDRX parameter transmitted by the core network is transparently transmitted to the UE through a base station (e.g., an evolved base station (eNB) or a next-generation base station (gNB)). For example, the mobile management entity (EME) of a core network transmits the eDRX parameter of the eDRX function to the UE through the eNB.

An RRC inactive state, referred to as an inactive state for short, is a low-power state of the UE that is transparent to the core network, but is visible to the access network. An RRC idle state is referred to as an idle state for short. Currently, in the idle state, the UE also receives some signaling transmitted by the network side. If the UE enters the inactive state, the UE needs to receive a paging message transmitted by the CN (i.e., a CN paging message), and also needs to receive a paging message transmitted by the access network (radio access network, RAN), i.e., an RAN paging message.

As shown in FIG. 4, embodiments of the present disclosure provide a terminal control method, which is performed by a terminal and includes:

S110: performing an eDRX function in an inactive state according to a first eDRX parameter.

The first eDRX parameter may include various eDRX parameters for performing the eDRX function in then inactive state.

The first eDRX parameter may come from various sources. For example, the first eDRX parameter is determined according to a communication protocol, or the first eDRX parameter is determined according to a pre-configuration acquired by the terminal.

The first eDRX parameter here includes but is not limited to at least one of:

an eDRX period;

a starting time domain position of a PTW;

an ending time domain position of the PTW;

a window length of the PTW;

a DRX period within the PTW.

In embodiments of the present disclosure, the terminal may perform the eDRX function in the inactive state. Through performing the eDRX function, the terminal can well balance the UE reachability and the power consumption even in the inactive state.

In an embodiment, the method includes: receiving first assistance information transmitted by an access network or a core network; and determining the first eDRX parameter according to the first assistance information.

The first assistance information here may be various information for the UE to acquire the first eDRX parameter.

For example, the first assistance information may be the first eDRX parameter directly.

For another example, the first assistance information may be other parameters that can be used by the terminal to determine the first eDRX parameter. For example, the first assistance information indicates an eDRX period of the UE in the inactive state, and also indicates that the PTW can refer to an eDRX parameter of an eDRX function in an idle state. In this case, the terminal can determine, according to the first assistance information, one or more first eDRX parameters required by the terminal to perform the eDRX function in the inactive state.

In an embodiment, the first assistance information includes one of:

a second eDRX parameter of an idle state transmitted by the core network;

the first eDRX parameter of the inactive state transmitted by the core network;

the first eDRX parameter of the inactive state transmitted by the access network.

In embodiments of the present disclosure, the terminal may execute the eDRX function in the idle state. Therefore, the first assistance information includes the second eDRX parameter of the idle state, that is, the eDRX function in the inactive state is determined according to the eDRX parameter of the idle state, i.e., the second eDRX parameter.

In some embodiments, the core network may directly transmit the first eDRX parameter required by the eDRX function in the inactive state to the UE.

In some embodiments, the first eDRX parameter may be transmitted by the access network. Here, the access device of the access network includes at least: a base station capable of establishing a wireless connection with the UE.

In an embodiment, the second eDRX parameter includes at least one of:

an eDRX period;

a time domain position indication parameter of a paging time window PTW.

It can be understood that the second eDRX parameter may be an eDRX parameter transmitted by the core network, then the second eDRX parameter at least indicates: the eDRX period and the time domain position indication parameter of the PTW. The time domain position indication parameter of the PTW can be used by the terminal to determine a time domain position of the PTW in the eDRX period.

The first eDRX parameter at least includes: an eDRX period.

In an embodiment, the eDRX period defined by the first eDRX parameter is less than or equal to the eDRX period defined by the second eDRX parameter.

In an embodiment, the first eDRX parameter at least includes an eDRX period, and the first eDRX parameter including at least the eDRX period may be an eDRX parameter from a base station, an eDRX parameter from a core network, or an eDRX parameter determined by the terminal itself, or an eDRX parameter determined based on a communication protocol.

In an embodiment, the first eDRX parameter further includes: a time domain position indication parameter of a paging time window PTW.

In an embodiment, the time domain position indication parameter of the PTW may be an optional parameter in the first eDRX parameter transmitted by the access network. The optional parameter here may be understood as an unessential parameter.

In an embodiment, the time domain position indication parameter of the PTW includes at least one of:

a starting time domain position of the PTW;

a window length of the PTW.

The time domain position indication parameter of the PTW included in the first eDRX parameter and the time domain position indication parameter of the PTW included in the second eDRX parameter both are used to determine the time domain position of the PTW.

Therefore, in some cases, the PTW time domain indication parameter may include: a parameter indicating the starting time domain position of the PTW and/or the window length of the PTW, and the position of the entire PTW within the domain can be easily and quickly determined according to these two parameters.

In another embodiment, the time domain position indication parameter of the PTW may include at least one of:

a starting time domain position of the PTW;

an ending time domain position of the PTW.

In a word, in embodiments of the present disclosure, the time domain position indication parameter of the PTW may indicate the position of the PTW in the time domain, and is not limited to specific parameter contents.

In an embodiment, as shown in FIG. 5, the present disclosure provides a terminal control method, which may be performed alone or in combination with any embodiment of the present disclosure. The method includes:

S210: determining whether an access network to which the terminal is connected supports the eDRX function.

Understandably, determining whether the access network to which the terminal is connected supports the eDRX function may include at least one of:

determining whether the access network to which the terminal is connected supports the eDRX function in the idle state; and/or determining whether the access network to which the terminal is connected supports the eDRX function in the inactive state.

In an embodiment, the terminal may determine whether the access network supports the eDRX function in the idle state and/or the inactive state according to the type of the base station and/or an indication transmitted by the base station.

In an embodiment, after determining whether the base station supports the eDRX function, the terminal may determine whether the terminal itself needs to perform the eDRX function in the idle state and/or the inactive state. For example, when the terminal determines that the access network does not support the eDRX function, the terminal may not perform the operation as described in S110. After determining that the access network supports the eDRX function or at least supports the eDRX function in the inactive state, the terminal performs the operation as described in S110.

In another embodiment, the S210 may include: receiving a first indication. The first indication at least indicates whether an access device supports the eDRX function of the terminal.

The first indication may be carried by various forms of message. For example, the first signaling may be carried in a broadcast message, and the broadcast message includes but is not limited to: a master information block (MIB), a system information block (SIB) 1, and any SIB signaling. For another example, the first indication may be carried in an RRC message, a control element (CE) of a media access control (MAC), or downlink control information (DCI).

For example, receiving the first indication includes at least one of:

receiving the first indication carried in a broadcast message;

receiving the first indication carried in a radio resource control RRC message;

receiving the first indication carried in any message in a radio access network notification area update RANU procedure;

receiving the first indication carried in an RAN paging message.

The message involved in performing the RANU procedure by the terminal may at least include: an RANU request and/or an RANU response. For example, the first indication may be carried in the RANU response.

Carrying the first indication through the above message leads to strong compatibility with related technology.

In an embodiment, the RRC message includes: an RRC release message.

The RRC release message may be an RRC message that indicates the terminal to release the connection with the access network and enter the idle state and/or the inactive state. In this way, before entering the inactive state, the terminal knows whether the access network supports the eDRX function in the idle state and/or the inactive state through the RRC release message, so that the terminal determines whether to perform the eDRX function in the idle state and/or the inactive state according to its own needs in the case that the access network device like the base station supports the eDRX function.

In an embodiment, the first indication carries a support identification bit of the eDRX function in the inactive state. The support identification bit indicates whether the access network supports the eDRX function in the inactive state. The support identification bit may include one or more bits for indicating whether the access network supports the eDRX function, for example, indicating whether the access network supports the eDRX function in the idle state and/or in the inactive state.

For example, the support identification bit may include one bit, and this bit has two bit values, one of which indicates that the access network supports the eDRX function in the inactive state, and the other one of which indicates that the access network does not support the eDRX function in the inactive state.

In another embodiment, the support identification bit may include two bits; one of the two bits is used to indicate whether the access network supports the eDRX function in the inactive state, and the other bit is used to indicate whether the access network supports the eDRX function in the idle state.

The above only shows examples of the support identification bit, and specific implementations are not limited to the above examples.

The S210 may include: determining that the access network supports the eDRX function in the inactive state, in response to the access network providing the first eDRX parameter; and/or determining that the access network does not support the eDRX function in the inactive state, in response to the access network not providing the first eDRX parameter In some cases, the access network may not directly transmit the first indication, but directly transmit the eDRX parameter to implicitly indicate whether it supports the eDRX function. For example, the access network directly transmits the first eDRX parameter to implicitly indicate whether the access network supports the eDRX function in the inactive state. In this way, at least the signaling overhead between the access network and the terminal caused by transmitting the first indication can be saved.

In an embodiment, both the core network and the access network may provide the terminal with the first eDRX parameter for the eDRX function of the terminal in the inactive state. In this case, embodiments of the present disclosure provide a mobile terminal control method, which may include: determining a third eDRX parameter according to the first eDRX parameter provided by the core network and the first eDRX parameter provided by the access network; and performing the eDRX function in the inactive state according to the third eDRX parameter.

The third eDRX parameter includes, but is not limited to, at least one of:

an eDRX period;

a time domain position indication parameter of a PTW.

Understandably, determining the third eDRX parameter according to the first eDRX parameter provided by the core network and the first eDRX parameter provided by the access network may include at least one of:

selecting a larger one or a smaller one from the eDRX period determined according to the first eDRX parameter provided by the core network and the eDRX period determined according to the first eDRX parameter provided by the access network as the eDRX period indicated by the third eDRX parameter; and/or selecting a larger window length or a smaller window length from the PTW determined according to the first eDRX parameter provided by the core network and the PTW determined according to the first eDRX parameter provided by the access network as the PTW indicated by the third eDRX parameter; and/or determining the PTW indicated by the third eDRX parameter from the PTW determined according to the first eDRX parameter provided by the core network and the PTW determined according to the first eDRX parameter provided by the access network.

Of course, the above are only examples, and specific implementations are not limited thereto.

As shown in FIG. 6A, embodiments of the present disclosure provide a terminal control method, which may include:

S311: monitoring a paging channel in the inactive state according to the first eDRX parameter and/or the second eDRX parameter of the idle state.

The first eDRX parameter here may be: an eDRX parameter of the inactive state, and the eDRX parameter of the inactive state is: a parameter required by the terminal to perform the eDRX function in the inactive state.

In an embodiment, the paging channel is monitored in the inactive state according to at least the first eDRX parameter or according to the combination of the first eDRX parameter and the second eDRX parameter of the idle state, i.e., some operations of the performation of the eDRX function of the terminal in the inactive state as described in S110.

In an embodiment, monitoring the paging channel in the inactive state according to the first eDRX parameter and/or the second eDRX parameter of the idle state includes: monitoring the paging channel in the inactive state according to the first eDRX parameter and/or the second eDRX parameter of the idle state, in response to the terminal enabling the eDRX function in the idle state and the eDRX function in the inactive state.

The terminal enables both the eDRX function in the idle state and the eDRX function in the inactive state, which means that the terminal can perform both the eDRX function in the idle state and the eDRX function in the inactive state.

In an embodiment, monitoring the paging channel in the inactive state according to the first eDRX parameter and/or the second eDRX parameter of the idle state includes at least one of:

monitoring the paging channel in the inactive state according to a larger one or a smaller one of the eDRX period indicated by the first eDRX parameter and the eDRX period indicated by the second eDRX parameter;

monitoring the paging channel in the inactive state according to a larger one or a smaller one of the PTW length indicated by the first eDRX parameter and the PTW length indicated by the second eDRX parameter.

In an embodiment, the S311 may include: monitoring both a core network CN paging message and an RAN paging message within a PTW determined according to the first eDRX parameter and/or the second eDRX parameter.

For example, the PTW is determined according to the first eDRX parameter and/or the second eDRX parameter. Within the PTW, the terminal monitors both the CN paging message and the RAN paging message. The CN paging message is a paging message from the CN, and the RAN paging message is a paging message from the RAN.

In this way, the terminal can be successfully paged by the CN or the RAN, which ensures the paging success rate of the terminal.

In an embodiment, a paging period for monitoring the paging channel is a maximum one or a minimum one of a CN paging period, an RAN paging period and a cell default paging period.

In some embodiments of the present disclosure, a plurality of paging periods are determined according to the first eDRX parameter and/or the second eDRX parameter, etc. In embodiments of the present disclosure, the maximum paging period or the minimum paging period among the plurality of paging periods is used as the final paging period for monitoring the paging channel in the inactive state.

For example, the paging period for monitoring the paging channel is the minimum one of the CN paging period, the RAN paging period, and the cell default paging period, so that the omission of the CN paging message and/or the RAN paging message can be reduced to a largest extent.

For example, the paging period for monitoring the paging channel is the maximum one of the CN paging period, the RAN paging period, and the cell default paging period, which can minimize the power consumption required for the terminal to monitor the paging channel.

The cell default paging period here includes, but is not limited to, a cell default paging period of an anchored cell of the terminal, a cell default paging period of a cell corresponding to a current position of the terminal, or a cell default paging period of a last cell accessed by the terminal.

In an embodiment, the method further includes: stopping monitoring the paging channel within the PTW, in response to monitoring any one of the CN paging message and the RAN paging message once within the PTW; or stopping monitoring the paging channel within the PTW, in response to monitoring the CN paging message once within the PTW.

In an embodiment, if a paging message is monitored once within the PTW, no matter whether the paging message is a CN paging message or a RAN paging message, the monitoring of the paging message within the PTW is stopped.

In another embodiment, only if the CN paging message is monitored once within the PTW, the monitoring of the paging channel within the PTW will be stopped; otherwise, the channel will be monitored within the PTW. For example, the RAN paging message is monitored once within the PTW, and at least the CN paging message will continue to be monitored within the PTW. In some cases, if the RAN paging message is monitored once within the PTW, the CN paging message and the RAN paging message will also continue to be monitored within the PTW.

In an embodiment, the method further includes: not monitoring the paging channel outside the PTW.

The paging channel is not monitored outside the PTW, that is, neither the CN paging message nor the RAN paging message are monitored.

In an embodiment, as shown in FIG. 6B, embodiments of the present disclosure provide a terminal control method, which may include:

S312: determining that the terminal enables the eDRX function in the idle state and the eDRX function in the inactive state, in response to the terminal having enabled the eDRX function in the inactive state.

In some cases, it may be considered that a precondition for performing the eDRX function in the inactive state is higher than a condition for performing the eDRX function in the idle state. In this way, if the terminal has enabled the eDRX function in the inactive state, it may be considered that the terminal must also enable the eDRX function in the idle state.

In an embodiment, the terminal supporting the eDRX function in the idle state includes: indicating, via a non-access stratum NAS configuration of the terminal, the terminal to use the eDRX function in the idle state; or indicating, via a non-access stratum NAS configuration of the terminal, the terminal to use the eDRX function in the idle state, and the access network supporting the eDRX function in the idle state; or receiving the second eDRX parameter of the idle state provided by the core network.

For example, the terminal receives an NAS message from the CN, or an NAS layer in the terminal generates the NAS configuration by itself, in a word, the terminal obtains the NAS configuration. If the NAS configuration indicates the terminal to use the eDRX function in the idle state, it may be considered that the terminal has enabled the eDRX function in the idle state.

For example, if the non-access stratum NAS configuration of the terminal indicates the terminal to use the eDRX function in the idle state, and the access network supports the eDRX function in the idle state, it may be considered that the terminal has enabled the eDRX function in the idle state. Here, both the NAS configuration and the supportability of the access network are considered.

For another example, the terminal directly receives the second eDRX parameter of the idle state from the core network, which is equivalent to that the core network implicitly indicates the terminal to use the eDRX function in the idle state.

In an embodiment, the terminal enabling the eDRX function in the inactive state includes: indicating, via an access network configuration, the terminal to use the eDRX function in the inactive state.

The terminal will receive the access network configuration from the access network, and the access network configuration may be transmitted through a higher-layer signaling or a physical layer signaling.

The access network configuration will indicate the terminal to use the eDRX function in the inactive state or not. If the access network configuration indicates the terminal to use the eDRX function in the inactive state, it means that the terminal has enabled the eDRX function in the inactive state.

As shown in FIG. 6C, the terminal control method provided by embodiments of the present disclosure may include:

S313: monitoring the CN paging message and the RAN paging message within the PTW determined according to the second eDRX parameter of the idle state, in response to the terminal having enabled the eDRX function in the idle state and not enabling the eDRX function in the inactive state.

If the terminal has enabled the eDRX function in the idle state, but does not enable the eDRX function in the inactive state, it means that the terminal may perform the eDRX function in the idle state currently, and does not perform the eDRX function in the inactive state.

In an embodiment, the method further includes: monitoring the CN paging message and the RAN paging message within the PTW determined according to the second eDRX parameter of the idle state, in response to the terminal having enabled the eDRX function in the idle state and not enabling the eDRX function in the inactive state.

In an embodiment, the method further includes: stopping monitoring the CN paging message within the PTW, in response to monitoring the CN paging message once within the PTW.

In another embodiment, the method further includes: monitoring the RAN paging message outside the PTW according to an RAN paging parameter of the inactive state.

Since the eDRX function in the inactive state is not enabled currently, the RAN paging message is still transmitted according to the RAN paging parameter. Therefore, it still needs to continue monitoring the RAN paging message outside the PTW according to the RAN paging parameter of the inactive state to ensure the paging success rate of the terminal.

A paging period for monitoring the RAN paging message outside the PTW includes one of:

an RAN paging period;

a smaller one of an RAN paging period and a cell default paging period.

Since monitoring the RAN paging message is continued within the PTW according to the RAN paging parameter, the paging period may be an RAN paging period indicated by the RAN paging parameter, or may be the smaller one of the RAN paging period and the cell default paging period.

Of course, the cell default paging period may be: a cell default paging period of a currently anchored cell of the terminal, but not limited to the default paging period of the anchored cell, and may also be a cell default paging period of a cell corresponding to a current position of the terminal or a last cell accessed by the terminal.

The smaller one of the RAN paging period and the cell default paging period can improve the paging efficiency.

In an embodiment, the terminal having enabled the eDRX function in the idle state includes:

indicating, via a non-access stratum NAS configuration of the terminal, the terminal to use the eDRX function in the idle state; or indicating, via a non-access stratum NAS configuration of the terminal, the terminal to use the eDRX function in the idle state, and the access network supporting the eDRX function in the idle state; or receiving the second eDRX parameter of the idle state provided by the core network.

In an embodiment, the terminal not enabling the eDRX function in the inactive state includes: not indicating, via an access network configuration, the terminal to use the eDRX function in the inactive state, and/or the access network not supporting the eDRX function in the inactive state.

For the relevant descriptions of the NAS configuration and the access network configuration here, reference may be made to the foregoing embodiments, which will not be repeated here.

As shown in FIG. 6D, embodiments of the present disclosure provide a terminal control method, which may include:

S314: monitoring the CN paging message and the RAN paging message within the PTW indicated by the first eDRX parameter of the inactive state, in response to the terminal not enabling the eDRX function in the idle state and having enabled the eDRX function in the inactive state.

If the terminal has enabled the eDRX function in the inactive state, but does not enable the eDRX function in the idle state, the terminal wants or needs to perform the eDRX function in the inactive state, but does not want to perform or does not perform the eDRX function in the idle state.

In this case, the terminal determines the PTW according to the first eDRX parameter, and monitors both the CN paging message and the RAN paging message within the PTW.

A paging period for monitoring the CN paging message and the RAN paging message within the PTW is one of:

a minimum one of a CN paging period, an RAN paging period, and a cell default paging period;

a smaller one of a CN paging period and an RAN paging period;

an RAN paging period.

The paging period for monitoring the paging channel within the PTW may be any of the above; if the minimum paging period or the smaller paging period is adopted, the loss of the paging message can be reduced or the paging message can be paged as soon as possible.

In an embodiment, the method further includes: stopping monitoring the paging channel within the PTW, in response to monitoring the RAN paging message once within the PTW; and/or stopping monitoring the paging channel within the PTW, in response to monitoring the CN paging message once within the PTW.

In an embodiment, the method further includes: monitoring the CN paging message outside the PTW according to a paging parameter of the idle state.

Since the terminal does not currently enable the eDRX function in the idle state, the core network may still transmit the CN paging message outside the PTW according to the paging parameter of the idle state. Therefore, the terminal will receive the CN paging message in the idle state outside the PTW, to ensure that the CN paging message is paged successfully or as soon as possible.

For example, a paging period for monitoring the CN paging message outside the PTW is one of:

a smaller one of a CN paging period and a cell default paging period;

a CN paging period.

The CN paging period here may be determined according to the aforementioned paging parameter of the idle state.

In an embodiment, the terminal not enabling the eDRX function in the idle state includes: an NAS configuration not indicating the terminal to use the eDRX function in the idle state; or indicating the terminal not to use the eDRX function in the idle state.

In an embodiment, the terminal having enabled the eDRX function in the inactive state includes: indicating, via an access network configuration, the terminal to use the eDRX function in the inactive state.

For the NAS configuration and/or the access network configuration here, reference may be made to the corresponding parts of the foregoing embodiments, which will not be repeated here.

In an embodiment, a scenario where the terminal dose not enable the eDRX function in the idle state and has enabled the eDRX function in the inactive state is an abnormal scenario.

This abnormal scenario may be specified by a communication protocol, or is pre-stored by the terminal, or is defined in a configuration or policy pre-received from the network side.

If the terminal enters such an abnormal scenario, it can transmit a prompt to the network side, and receive an abnormal correction operation returned by the network side based on the prompt, so as to exit the abnormal scenario and access to a normal scenario. The normal scenario may include: a scenario where the terminal enables the eDRX function in the idle state and does not enable the eDRX function in the inactive state; or a scenario where the terminal enables both the eDRX function in the idle state and the eDRX function in the inactive state; or a scenario where the terminal neither enables the eDRX function in the idle state nor the eDRX function in the inactive state.

In an embodiment, the method further includes: monitoring the CN paging message and the RAN paging message, respectively, in response to the terminal not enabling the eDRX function in the idle state and not enabling the eDRX function in the inactive state.

If the terminal neither enables the eDRX function in the idle state nor the eDRX function in the inactive state, there is no PTW to monitor the paging channel specifically.

Therefore, the CN paging message and the RAN paging message are monitored, respectively.

In an embodiment, a paging period for monitoring the CN paging message and the RAN paging message respectively is one of:

a minimum one of a CN paging period, an RAN paging period and a cell default paging period;

a smaller one of a CN paging period and an RAN paging period.

For the definition of the cell default paging period, reference may be made to any of the foregoing embodiments.

The CN paging period may be determined according to the paging parameter of the idle state; and the RAN paging period may be determined according to the paging parameter of the inactive state.

In an embodiment, the terminal not enabling the eDRX function in the idle state includes: not indicating, via an NAS configuration, the terminal to use the eDRX function in the idle state; or the access network not supporting the eDRX function in the idle state.

In an embodiment, the terminal not enabling the eDRX function in the inactive state includes at least one of:

an access network configuration not indicating the terminal to use the eDRX function in the inactive state;

an access network configuration indicating the terminal not to use the eDRX function in the inactive state;

the access network not supporting the eDRX function in the inactive state.

As shown in FIG. 7A, embodiments of the present disclosure provide an information processing method, which is performed by an access device of an access network, and includes:

S410: transmitting first assistance information, the first assistance information being configured for a terminal to determine a first eDRX parameter for performing an eDRX function in an inactive state.

The access device may include at least a base station.

The first assistance information may be configured for the terminal to acquire the first eDRX parameter for performing the eDRX function in the inactive state.

In an embodiment, the first assistance information may be the first eDRX parameter itself, or may be some eDRX parameters included in the first eDRX parameter, or a method for determining the first eDRX parameter, or the like.

In a word, after receiving the first assistance information transmitted by the access device, the terminal can determine the first eDRX parameter.

As shown in FIG. 7B, embodiments of the present disclosure further provide an information processing method, which may include:

S510: transmitting a first indication, which indicates whether the access device supports the eDRX function.

For example, the first indication may at least indicate whether the access device supports the eDRX function in the inactive state.

In an embodiment, a precondition that the access network supports the eDRX function in the inactive state includes:

the access network supporting an eDRX period of an idle state; and/or the access network not supporting the eDRX function in the inactive state, in a case where the access network does not support the eDRX function in the idle state.

In an embodiment, transmitting the first indication includes:

transmitting the first indication in a broadcast message carrying the first indication;

transmitting a radio resource control RRC message carrying the first indication;

transmitting any message in an RANU procedure carrying the first indication;

transmitting an RAN paging message carrying the first indication.

The broadcast message may be an MIB or an SIB, and in this case, an indication granularity of the first indication is a base station or a cell.

In the case where the first indication is transmitted through the RRC message, any message in the RANU procedure, or the RAN paging message, and at this time, the indication granularity of the first indication is a UE.

In an embodiment, the RRC message includes: an RRC release message.

The RRC release message here is an RRC message that prompts the terminal to enter the idle state or the inactive state from a connected state. At this time, the RRC message carries the first indication, so that the terminal may know whether the access network supports the eDRX function in the idle state and/or the inactive state according to the first indication.

In an embodiment, the first indication carries a support identification bit of the eDRX function in the inactive state. The support identification bit indicates whether the access network supports the eDRX function in the inactive state.

In another embodiment, the first assistance information includes: the first eDRX parameter.

In an embodiment, the first eDRX parameter includes at least: an eDRX period.

In an embodiment, the first eDRX parameter further includes: a time domain position indication parameter of a paging time window PTW.

In an embodiment, the time domain position indication parameter of the PTW includes: a starting time domain position of the PTW; a window length of the PTW.

In an embodiment, the method further includes: receiving second assistance information transmitted by a core network; and determining the first assistance information based on the second assistance information.

The first assistance information here is determined according to the second assistance information, so that the first assistance information keeps consistent with the second assistance information provided by the core network, thereby ensuring the consistency between the access network and the core network on the eDRX parameter for the terminal to perform the eDRX function.

In another embodiment, the access device may directly determine the first assistance information without based on the second assistance information.

In an embodiment, determining the first assistance information based on the second assistance information includes at least one of:

determining the first assistance information in response to determining according to the second assistance information that the core network has enabled the eDRX function of the terminal;

determining the first assistance information in response to determining according to the second assistance information that the core network has configured an eDRX period of the terminal;

determining the first assistance information in response to determining according to the second assistance information that the core network has configured a time domain indication parameter of a PTW of the terminal.

For example, the second assistance information indicates that the core network has enabled the eDRX function of the terminal or the core network has at least enabled the eDRX function of the terminal in the idle state, then the access network can enable the eDRX function of the terminal in the inactive state, and configure the eDRX function of the terminal in the inactive state.

For another example, the access device configures an eDRX period indicated by the first assistance information according to an eDRX period indicated by the second assistance information. In this case, the eDRX period indicated by the first assistance information may be less than or equal to the eDRX period indicated by the second assistance information.

In another embodiment, a PTW indicated by the first assistance information is determined according to a PTW indicated by the second assistance information.

In an embodiment, the second assistance information is carried in an information element IE of CN assistance information for an RRC inactive state.

In an embodiment, receiving the second assistance information transmitted by the core network includes:

receiving a UE context creation message that is transmitted by the core network and carries the second assistance information; or receiving a UE context modification message that is transmitted by the core network and carries the second assistance information; or receiving a CN paging message carrying the second assistance information.

The second assistance information is transmitted through the context creation message, the context modification message and/or the CN paging message, so that it is unnecessary to set up a special message to transmit the second assistance information, and a strong compatibility with the related art is obtained.

In an embodiment, the method further includes: returning the first assistance information to the core network.

If the access device determines the first assistance information, it can transmit the determined first assistance information to the CN. The first assistance information here may be determined based on the second assistance information, or may not be determined according to the second assistance information.

In an embodiment, returning the first assistance information to the core network includes:

returning to the core network a UE context creation response that is transmitted by the access network and carries the first assistance information; or returning to the core network a UE context modification response that is transmitted by the access network and carries the first assistance information; or returning to the core network a CN paging response carrying the first assistance information.

In an embodiment, transmitting the first assistance information includes: transmitting the first assistance information through an RRC message.

The access network device transmits the first assistance information to the terminal through the RRC message. In another embodiment, the first assistance information may also be transmitted through a broadcast message or a multicast message.

In an embodiment, the embodiment of the present disclosure further provides an information processing method, which includes: transmitting an access network configuration. The access network configuration may be configured for the terminal to determine whether to enable the eDRX function in the inactive state.

The access network configuration here may indicate the terminal to use the eDRX function in the inactive state or indicate the terminal not to use the eDRX function in the inactive state.

In another embodiment, transmitting the access network configuration includes: transmitting the access network configuration that indicates to enable the eDRX function in the inactive state, in response to the core network having enabled an eDRX function in an idle state of the terminal.

In an embodiment, transmitting the access network configuration includes:

transmitting the access network configuration in any message in an RANU procedure;

transmitting the access network configuration in an RAN paging message.

In another embodiment, the access network configuration carries an activation identification bit of the eDRX function in the inactive state. The activation identification bit indicates whether the access network activates the eDRX function in the inactive state of the terminal.

Figures 8A, 8B, 8C:
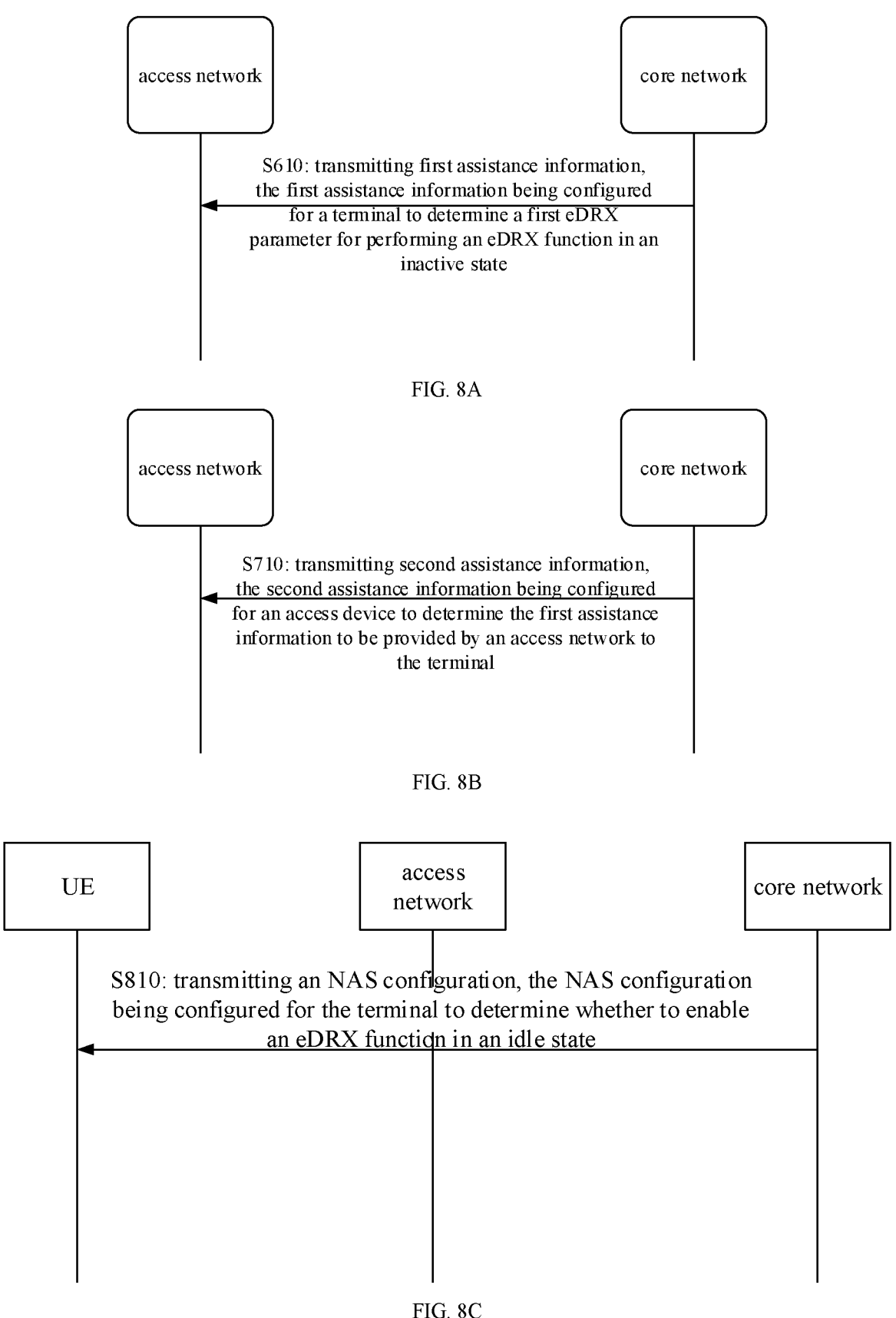
FIG. 8A is a schematic flowchart showing an information processing method, according to an illustrative embodiment.
FIG. 8B is a schematic flowchart showing an information processing method, according to an illustrative embodiment.
FIG. 8C is a schematic flowchart showing an information processing method, according to an illustrative embodiment

As shown in FIG. 8A, embodiments of the present disclosure provide an information processing method, which is performed by a core network device of a core network and includes:

S610: transmitting first assistance information, the first assistance information being configured for a terminal to determine a first eDRX parameter for performing an eDRX function in an inactive state.

The core network may also transmit the first assistance information, for example, the core network transparently transmits the first assistance information to the ULE through a base station.

As shown in FIG. 8B, embodiments of the present disclosure provide an information processing method, which may include:

S710: transmitting second assistance information, the second assistance information being configured for an access device to determine the first assistance information to be provided by an access network to the terminal.

In an embodiment, the second assistance information includes at least one of:

an enabling indication, indicating that the eDRX function of the terminal has been enabled;

a period configuration, indicating an eDRX period of the terminal;

a PTW configuration, indicating a time domain indication parameter of a PTW of the terminal.

The second assistance information is transmitted to the access network for the access network to determine the first assistance information to be transmitted to the terminal.

In an embodiment, the second assistance information is carried in an information element IE of CN assistance information for an RRC inactive state.

In an embodiment, receiving the second assistance information transmitted by the core network includes:

receiving a UE context creation message that is transmitted by the core network and carries the second assistance information; or receiving a UE context modification message that is transmitted by the core network and carries the second assistance information; or receiving a CN paging message carrying the second assistance information.

In an embodiment, the method further includes: receiving the first assistance information returned by the access network based on the second assistance information.

In an embodiment, receiving the first assistance information returned by the access network based on the second assistance information includes:

receiving a UE context creation response that is transmitted by the access network and carries the first assistance information; or receiving a UE context modification response that is transmitted by the access network and carries the first assistance information; or receiving a CN paging response carrying the first assistance information.

As shown in FIG. 8C, embodiments of the present disclosure further provide an information processing method, which may include:

S810: transmitting an NAS configuration, the NAS configuration being configured for the terminal to determine whether to enable an eDRX function in an idle state.

In embodiments of the present disclosure, the NAS configuration carries an activation identification bit of the eDRX function in the idle state. The activation identification bit indicates whether the core network enables the eDRX function in the idle state.

As shown in FIG. 9, embodiments of the present disclosure provide a terminal control apparatus, which is applied to a terminal and includes: a performing module 110.

The performing module 110 is configured to perform an eDRX function in an inactive state according to a first eDRX parameter.

In an embodiment, the performing module 110 may be a program module. When the program module is executed by the processor, the eDRX function can be performed in the inactive state according to the first eDRX parameter.

In another embodiment, the performing module 110 may include: a software-hardware combination module. The software-hardware combination module includes, but is not limited to, a programmable array. The programmable array includes, but is not limited to, a field programmable array and/or a complex programmable array.

In yet another embodiment, the performing module 110 may include: a pure hardware module. The pure hardware module includes, but is not limited to, an application-specific integrated circuit.

Understandably, the terminal control apparatus includes: a receiving module and a determining module.

The receiving module is configured to receive first assistance information transmitted by an access network or a core network.

The determining module is configured to determine the first eDRX parameter according to the first assistance information.

In an embodiment, the first assistance information includes one of:

a second eDRX parameter of an idle state transmitted by the core network;

the first eDRX parameter of the inactive state transmitted by the core network;

the first eDRX parameter of the inactive state transmitted by the access network.

In an embodiment, the second eDRX parameter includes at least one of:

an eDRX period;

a time domain position indication parameter of a paging time window PTW.

In an embodiment, the first eDRX parameter at least includes an eDRX period.

In an embodiment, the first eDRX parameter further includes: a time domain position indication parameter of a paging time window PTW.

In an embodiment, the time domain position indication parameter of the PTW includes:

a starting time domain position of the PTW;

a window length of the PTW.

In an embodiment, the method further includes: determining whether an access network to which the terminal is connected supports the eDRX function.

In an embodiment, the receiving module of the terminal control apparatus is further configured to receive a first indication. The first indication at least indicates whether an access device supports the eDRX function in the inactive state.

In an embodiment, the receiving module is further configured to perform at least one of:

receiving the first indication carried in a broadcast message;

receiving the first indication carried in a radio resource control RRC message;

receiving the first indication carried in any message in a radio access network notification area update RANU procedure;

receiving the first indication carried in an RAN paging message.

In an embodiment, the RRC message includes an RRC release message.

In an embodiment, the first indication carries a support identification bit of the eDRX function in the inactive state. The support identification bit indicates whether the access network supports the eDRX function in the inactive state.

In an embodiment, the determining module is configured to perform at least one of:

determining that the access network supports the eDRX function in the inactive state, in response to the access network providing the first eDRX parameter; and/or determining that the access network does not support the eDRX function in the inactive state, in response to the access network not providing the first eDRX parameter.

In an embodiment, the performing module 110 is further configured to monitor a paging channel in the inactive state according to the first eDRX parameter and/or a second eDRX parameter of an idle state.

In an embodiment, the performing module 110 is configured to perform at least one of:

monitoring the paging channel in the inactive state according to the first eDRX parameter and/or the second eDRX parameter of the idle state, in response to the terminal enabling the eDRX function in the idle state and the eDRX function in the inactive state.

In an embodiment, the performing module 110 is further configured to perform at least one of:

monitoring the paging channel in the inactive state according to a larger one or a smaller one of an eDRX period indicated by the first eDRX parameter and an eDRX period indicated by the second eDRX parameter;

monitoring the paging channel in the inactive state according to a larger one or a smaller one of a PTW length indicated by the first eDRX parameter and a PTW length indicated by the second eDRX parameter.

In an embodiment, the performing module 110 is further configured to monitor both a core network CN paging message and an RAN paging message in the paging channel within a PTW determined according to the first eDRX parameter and/or the second eDRX parameter.

In an embodiment, a paging period for monitoring the paging channel is a minimum one of a CN paging period, an RAN paging period and a cell default paging period.

In an embodiment, the performing module 110 is further configured to perform at least one of:

stopping monitoring the paging channel within the PTW, in response to monitoring any one of the CN paging message and the RAN paging message once within the PTW; or stopping monitoring the paging channel within the PTW, in response to monitoring the CN paging message once within the PTW.

In an embodiment, the performing module 110 is further configured to not monitor the paging channel outside the PTW.

In an embodiment, the apparatus further includes an enabling module. The enabling module is configured to determine that the terminal enables the eDRX function in the idle state and the eDRX function in the inactive state, in response to the terminal having enabled the eDRX function in the inactive state.

In an embodiment, the terminal supporting the eDRX function in the idle state includes:

indicating, via a non-access stratum NAS configuration of the terminal, the terminal to use the eDRX function in the idle state; or indicating, via a non-access stratum NAS configuration of the terminal, the terminal to use the eDRX function in the idle state, and the access network supporting the eDRX function in the idle state; or receiving the second eDRX parameter of the idle state provided by the core network.

In an embodiment, the terminal enabling the eDRX function in the inactive state includes: indicating, via an access network configuration, the terminal to use the eDRX function in the inactive state.

In an embodiment, the method further includes: monitoring a CN paging message and an RAN paging message within a PTW determined according to a second eDRX parameter of an idle state, in response to the terminal having enabled the eDRX function in the idle state and not enabling the eDRX function in the inactive state.

In an embodiment, the method further includes: stopping monitoring the CN paging message within the PTW, in response to monitoring the CN paging message once within the PTW.

In an embodiment, the method further includes: monitoring the RAN paging message outside the PTW according to an RAN paging parameter of the inactive state.

In an embodiment, a paging period for monitoring the RAN paging message outside the PTW includes one of:

an RAN paging period;

a smaller one of an RAN paging period and a cell default paging period.

In an embodiment, the terminal having enabled the eDRX function in the idle state includes:

indicating, via a non-access stratum NAS configuration of the terminal, the terminal to use the eDRX function in the idle state; or indicating, via a non-access stratum NAS configuration of the terminal, the terminal to use the eDRX function in the idle state, and the access network supporting the eDRX function in the idle state; or receiving the second eDRX parameter of the idle state provided by the core network.

In an embodiment, the terminal not enabling the eDRX function in the inactive state includes: not indicating, via an access network configuration, the terminal to use the eDRX function in the inactive state and/or the access network not supporting the eDRX function in the inactive state.

In an embodiment, the performing module 110 is further configured to monitor a CN paging message and an RAN paging message within a PTW indicated by the first eDRX parameter of the inactive state, in response to the terminal not enabling an eDRX function in an idle state and having enabled the eDRX function in the inactive state.

In an embodiment, a paging period for monitoring the CN paging message and the RAN paging message within the PTW is one of:

a minimum one of a CN paging period, an RAN paging period, and a cell default paging period;

a smaller one of a CN paging period and an RAN paging period;

an RAN paging period.

In an embodiment, the performing module 110 is further configured to: stop monitoring a paging channel within the PTW, in response to monitoring the RAN paging message once within the PTW; and/or stop monitoring a paging channel within the PTW, in response to monitoring the CN paging message once within the PTW.

In an embodiment, the performing module 110 is further configured to monitor the CN paging message outside the PTW according to a paging parameter of the idle state.

In an embodiment, a paging period for monitoring the CN paging message outside the PTW is one of: a smaller one of a CN paging period and a cell default paging period; a CN paging period.

In an embodiment, the terminal not enabling the eDRX function in the idle state includes: not indicating, via an NAS configuration, the terminal to use the eDRX function in the idle state; indicating the terminal not to use the eDRX function in the idle state.

In an embodiment, the terminal having enabled the eDRX function in the inactive state includes: indicating, via an access network configuration, the terminal to use the eDRX function in the inactive state.

In an embodiment, a scenario where the terminal dose not enable the eDRX function in the idle state and has enabled the eDRX function in the inactive state is an abnormal scenario.

In an embodiment, the apparatus further includes: an enabling module. The enabling module is further configured to monitor a CN paging message and an RAN paging message, respectively, in response to the terminal not enabling an eDRX function in an idle state and not enabling the eDRX function in the inactive state.

In an embodiment, a paging period for monitoring the CN paging message and the RAN paging message respectively is one of:

a minimum one of a CN paging period, an RAN paging period and a cell default paging period;

a smaller one of a CN paging period and an RAN paging period.

In an embodiment, the terminal not enabling the eDRX function in the idle state includes: not indicating, via an NAS configuration, the terminal to use the eDRX function in the idle state; or indicating the terminal not to use the eDRX function in the idle state.

In an embodiment, the terminal not enabling the eDRX function in the inactive state includes at least one of:

not indicating, via an access network configuration, the terminal to use the eDRX function in the inactive state;

indicating, via an access network configuration, the terminal not to use the eDRX function in the inactive state;

the access network not supporting the eDRX function in the inactive state.

As shown in FIG. 10, embodiments of the present disclosure provide an information processing apparatus, which is applied to an access device of an access network and including: a first transmitting module 210.

The first transmitting module 210 is configured to transmit first assistance information. The first assistance information is configured for a terminal to determine a first eDRX parameter for performing an eDRX function in an inactive state.

In an embodiment, the first transmitting module 210 may be a program module. When the program module is executed by the processor, the first assistance information is transmitted.

In another embodiment, the first transmitting module 210 may include: a software-hardware combination module. The software-hardware combination module includes, but is not limited to, a programmable array. The programmable array includes, but is not limited to, a field programmable array and/or a complex programmable array.

In yet another embodiment, the first transmitting module 210 may include: a pure hardware module. The pure hardware module includes, but is not limited to, an application-specific integrated circuit.

Understandably, the first transmitting module 210 is further configured to transmit a first indication. The first indication indicates whether the access device supports the terminal to start the eDRX function in the inactive state.

Understandably, a precondition that the access network supports the eDRX function in the inactive state includes: the access network supporting an eDRX period of an idle state; and/or the access network not supporting the eDRX function in the inactive state, in a case where the access network does not support the eDRX function in the idle state.

Understandably, the first transmitting module 210 is configured to perform at least one of:

transmitting the first indication in a broadcast message carrying the first indication;

transmitting a radio resource control RRC message carrying the first indication;

transmitting any message in an RANU procedure carrying the first indication;

transmitting an RAN paging message carrying the first indication.

In an embodiment, the RRC message includes: an RRC release message.

In an embodiment, the first indication carries a support identification bit of the eDRX function in the inactive state. The support identification bit indicates whether the access network supports the eDRX function in the inactive state.

In an embodiment, the first assistance information includes: the first eDRX parameter.

In an embodiment, the first eDRX parameter at least includes: an eDRX period.

In an embodiment, the first eDRX parameter further includes: a time domain position indication parameter of a paging time window PTW.

In an embodiment, the time domain position indication parameter of the PTW includes:

a starting time domain position of the PTW;

a window length of the PTW.

In an embodiment, the information processing apparatus applied to the access device further includes: a receiving module and a determining module.

The receiving module is configured to receive second assistance information transmitted by a core network.

The determining module is configured to determine the first assistance information based on the second assistance information.

Understandably, the determining module is configured to perform at least one of:

determining the first assistance information in response to determining according to the second assistance information that the core network has enabled the eDRX function of the terminal;

determining the first assistance information in response to determining according to the second assistance information that the core network has configured an eDRX period of the terminal;

determining the first assistance information in response to determining according to the second assistance information that the core network has configured a time domain indication parameter of a PTW of the terminal.

In an embodiment, the second assistance information is carried in an information element IE of CN assistance information for an RRC inactive state.

Understandably, the receiving module is configured to: receive a UE context creation message that is transmitted by the core network and carries the second assistance information; or receive a UE context modification message that is transmitted by the core network and carries the second assistance information; or receive a CN paging message carrying the second assistance information.

In an embodiment, the information processing apparatus applied to the access device further includes: a returning module. The returning module is configured to return the first assistance information to the core network.

In an embodiment, the returning module is configured to:

return to the core network a UE context creation response that is transmitted by the access network and carries the first assistance information; or return to the core network a UE context modification response that is transmitted by the access network and carries the first assistance information; or return to the core network a CN paging response carrying the first assistance information.

In an embodiment, the first transmitting module 210 is configured to: transmit the first assistance information through an RRC message.

In an embodiment, the first transmitting module 210 is further configured to: transmit an access network configuration. The access network configuration is configured for the terminal to determine whether to enable the eDRX function in the inactive state.

In an embodiment, the first transmitting module 210 is further configured to: transmit the access network configuration that indicates to enable the eDRX function in the inactive state, in response to a core network having enabled an eDRX function in an idle state of the terminal.

In an embodiment, the first transmitting module 210 is further configured to perform at least one of:

transmitting the access network configuration in any message in an RANU procedure;

transmitting the access network configuration in an RAN paging message.

In an embodiment, the access network configuration carries an activation identification bit of the eDRX function in the inactive state. The activation identification bit indicates whether the access network activates the eDRX function in the inactive state of the terminal.

As shown in FIG. 11, embodiments of the present disclosure provide an information processing apparatus, which is applied to a core network device of a core network and includes: a second transmitting module 310. The second transmitting module 310 is configured to transmit first assistance information. The first assistance information is configured for a terminal to determine a first eDRX parameter for performing an eDRX function in an inactive state.

In an embodiment, the second transmitting module 310 may be a program module. When the program module is executed by the processor, the first assistance information is transmitted.

In another embodiment, the second transmitting module 310 may include a software-hardware combination module. The software-hardware combination module includes, but is not limited to, a programmable array. The programmable array includes, but is not limited to, a field programmable array and/or a complex programmable array.

In yet another embodiment, the second transmitting module 310 may include: a pure hardware module. The pure hardware module includes, but is not limited to, an application-specific integrated circuit.

Understandably, the second transmitting module 310 is further configured to transmit second assistance information. The second assistance information is configured for an access device to determine the first assistance information to be provided by an access network to the terminal.

Understandably, the second assistance information includes at least one of:

an enabling indication, indicating that the eDRX function of the terminal has been enabled;

a period configuration, indicating an eDRX period of the terminal;

a PTW configuration, indicating a time domain indication parameter of a PTW of the terminal.

Understandably, the second assistance information is carried in an information element IE of CN assistance information for an RRC inactive state.

Understandably, the second transmitting module 310 is configured to: transmit a UE context creation message that is transmitted by the core network and carries the second assistance information; or transmit a UE context modification message that is transmitted by the core network and carries the second assistance information; or transmit a CN paging message carrying the second assistance information.

In an embodiment, the information processing apparatus applied to the core network device further includes: a receiving module. The receiving module is configured to receive the first assistance information returned by the access network based on the second assistance information.

In an embodiment, the receiving module is further configured to: receive a UE context creation response that is transmitted by the access network and carries the first assistance information; or receive a UE context modification response that is transmitted by the access network and carries the first assistance information; or receive a CN paging response carrying the first assistance information.

In an embodiment, the second transmitting module 310 is configured to transmit an NAS configuration. The NAS configuration is configured for the terminal to determine whether to enable an eDRX function in an idle state.

In an embodiment, the NAS configuration carries an activation identification bit of the eDRX function in the idle state. The activation identification bit indicates whether the core network enables the eDRX function in the idle state.

Embodiments of the present disclosure provide a method for a UE to use an eDRX function in an inactive state as follows.

A terminal can use the eDRX function in the inactive state. That is, the terminal determines an RAN side eDRX parameter configuration to be used in the inactive state according to an eDRX parameter determined by a core network and/or an eDRX parameter determined by a base station, and the eDRX parameter is used by the UE to receive a paging message in the inactive state.

In an embodiment, the base station provides an indication of whether the DRX function is supported. The indication is an indication with a granularity of one base station (i.e., per base station). The indication of whether the base station supports the eDRX function includes, but is not limited to, whether the base station supports an eDRX function in an idle state, and/or whether the base station supports the eDRX function in the inactive state.

As an embodiment, the base station informs the terminal whether the base station supports the eDRX function in the inactive state in a broadcast message or an RRC message. For example, the RRC message includes, but is not limited to, an RRC release message.

As an embodiment, a precondition that the base station supports the eDRX function in the inactive state is that the base station supports the eDRX function in the idle state.

As an embodiment, the base station does not support the eDRX function in the idle state, it means that the base station does not support the eDRX function in the inactive state.

The eDRX parameter provided by the base station is an eDRX parameter of the inactive state, which may also be referred to as the eDRX function in the inactive state.

This function is an optional function, and activation of an inactive state feature for the UE by an eNB implicitly indicates that the base station supports this feature.

The eDRX parameter provided by the core network may include:

an eDRX period, a starting point of a PTW, i.e., a starting time domain position of the PTW;

a window length of the PTW.

In an embodiment, the eDRX period, the starting point of the PTW, and the window length of the PTW provided by the core network here are mandatory parameters.

In an embodiment, the eDRX parameter provided by the core network is an eDRX parameter of the idle state, and the eDRX parameter of the idle state can be used by the base station or the terminal to determine an eDRX parameter corresponding to the eDRX function in the inactive state.

An RAN side eDRX parameter provided by the base station may be: an eDRX period.

In an embodiment, the eDRX period in the RAN side eDRX parameter provided by the base station here may be a mandatory parameter.

In this case, both the starting point of the PTW and the window length of the PTW are provided by the core network. That is, a starting point of a PTW and a window length of a PTW in the RAN side eDRX parameter are optional parameters.

The RAN side eDRX parameter provided by the base station may be: an eDRX parameter for the terminal to perform the eDRX function in the inactive state.

The base station may also interact with the core network to acquire assistance information, which is used as a reference for the base station to determine an RAN side eDRX parameter configuration.

Based on the assistance information, the base station may determine at least one of the following information:

whether the core network enables the eDRX function for the UE, for example, whether the core network enables the eDRX function in the idle state for the terminal;

whether the core network determines the eDRX period for the UE; for example, whether the core network determines the eDRX period used for performing the eDRX function in the idle state for the UE;

the eDRX period, the window length of the PTW and/or the starting point of the PTW determined by the core network for the UE.

The base station may configure the eDRX parameter for the inactive state of the terminal according to the information content determined based on the assistance information. For example, when the eDRX function in the inactive state determined by the base station is performed, the eDRX period cannot be greater than an eDRX period determined by the core network or a value pre-agreed in the protocol.

As an embodiment, the assistance information is provided in an information element of CN assistance information for an RRC inactive state (Core Network Assistance Information for RRC INACTIVE IE).

As an embodiment, the core network informs the base station of the assistance information in a UE context creation or modification message.

As an embodiment, the core network informs the base station of the assistance information in a paging message.

In an embodiment, the base station may also interact with the core network to inform the core network of the determined RAN side eDRX parameter configuration.

For example, the RAN side eDRX parameter configuration may be notified to the core network as the assistance information, for example, the base station notifies the core network of this information in a UE context creation/modification response message.

For example, the base station informs the core network of this information in a newly added message, such as a paging response message.

That is, in some embodiments, the RAN side eDRX parameter determined by the RAN side and reported to the core network constitutes the content of the first assistance information, and may be reported through a newly added signaling, such as a newly added dedicated signaling In an embodiment, the base station transmits the RAN side eDRX parameter to the terminal in a hang-up (RRC release) message sent to the terminal. In this case, the RAN side eDRX parameter is configured with a granularity of UE, that is, the RAN side eDRX parameter is in a per-UE configuration.

As an embodiment, the precondition for the base station to activate the eDRX function in the inactive state for the terminal is that the terminal has activated the eDRX in the idle state or the CN configures the eDRX in the idle state for the terminal.

Understandably, the base station may notify the UE of an identification for indicating that the eDRX function in the inactive state has been activated/deactivated for the UE, and this function is effective in the range of RNA.

Understandably, the base station provides/does not provide the RAN side eDRX parameter configuration for the terminal; it is implied that the base station activates/deactivates the eDRX function in the inactive state for the UE, and this function is effective in the range of RNA.

Understandably, the base station activates/deactivates the eDRX function in the inactive state of the terminal in an RNAU procedure initiated by the terminal.

Understandably, the anchor base station may carry the RAN side eDRX parameter for the UE and/or the identification indicating that the base station activates/deactivates the eDRX function for the UE in an RAN paging parameter, which is used as a reference for a current serving base station to page the terminal.

In an embodiment, the terminal may determine monitoring of the paging message according to the eDRX parameter determined by the core network and/or the eDRX parameter determined by the base station.

Regarding whether the terminal supports the eDRX function in the idle state and whether the terminal supports the eDRX function in the inactive state, behaviors of the terminal will be discussed separately.

Behavior 1 where the terminal enables both the eDRX function in the idle state and the eDRX function in the inactive state may be as follows.

Channel monitoring is performed according to the eDRX parameter of the e-DRX function in the idle state and/or the eDRX function of the eDRX function in the inactive state.

As an embodiment, an eDRX period used for the channel monitoring is a minimum one or a maximum one of an eDRX period in the idle state and an eDRX period in the inactive state.

As an embodiment, a window length of a PTW used for the channel monitoring is a minimum one or a maximum one of a window length of a PTW in the idle state and a window length of a PTW in the inactive state.

As an embodiment, specific parameters of the PTW (a starting point of the PTW and a window length of the PTW) are provided by the core network.

As an embodiment, within the PTW, the terminal will monitor both the CN paging message and the RAN paging message.

As an embodiment, a period for paging monitoring is min {a CN paging period, an RAN paging period, a cell default paging period}.

As an embodiment, when the terminal detects the CN paging message or the RAN paging message once, the terminal stops subsequent monitoring within the PTW.

As an embodiment, when the terminal detects the CN paging message once, the terminal stops subsequent monitoring within the PTW.

When the CN paging message is detected, it means that an abnormality occurs, then it is necessary to stop monitoring, so as to reduce the power consumption caused by continuous monitoring.

As an example, outside the PTW, the terminal will not monitor any paging message.

It is worth noting that the terminal enables both the eDRX function in the idle state and the eDRX function in the inactive state, which can be performed under a condition at least including that the terminal is enabled with the eDRX function in the idle state and the eDRX function in the inactive state.

As an embodiment, the terminal is enabled with the eDRX function in the inactive state, it implicitly means that the terminal is also enabled with the eDRX function in the idle state.

As an embodiment, the terminal being enabled with the eDRX function in the idle state includes that an NAS configuration indicates the terminal to use the eDRX function in the idle state, and the base station also supports the eDRX function in the idle state.

As an embodiment, the terminal being enabled with the eDRX in the inactive state includes that a base station configuration indicates the terminal to use the eDRX function in the inactive state. Alternatively, the base station provides the eDRX parameter in the inactive state to implicitly express that the base station supports this feature. Therefore, an indication of whether the base station configuration supports the eDRX function in the inactive state is optional.

Behavior 2 where the terminal only enables the eDRX function in the idle state and does not enable the eDRX function in the inactive state may be as follows.

Within the PTW, the terminal will monitor both the CN paging message and the RAN paging message.

A period for paging monitoring is min {a CN paging period, an RAN paging period, a cell default paging period}.

Understandably, when the terminal detects the CN paging message once, the terminal stops subsequent monitoring within the PTW.

Understandably, outside the PTW, the terminal will continue to monitor the RAN paging message; further, a period for monitoring is an RAN paging period or min {an RAN paging period, a cell default paging period}.

It is worth noting that the case where the terminal only enables the eDRX function in the idle state and does not enable the eDRX function in the inactive state may be determined in the following ways.

The terminal is enabled with the eDRX function in the idle state, but not enabled with the eDRX function in the inactive state.

Understandably, the terminal is enabled with the eDRX function in the idle state, and the base station also supports the eDRX function in the idle state.

Understandably, the terminal is not enabled with the eDRX function in the inactive state, which may include that the base station does not configure the terminal to use the eDRX function in the inactive state (the base station supports the eDRX function in the inactive state at this time), or the base station does not support the eDRX function, either.

Behavior 3 where the terminal does not enable the eDRX function in the idle state and enables the eDRX function in the inactive state may be as follows.

Within the PTW, the terminal will monitor both the CN paging message and the RAN paging message.

A period for paging monitoring is min {a CN paging period, an RAN paging period, a cell default paging period} or min {a CN paging period, an RAN paging period}.

Understandably, within the PTW, the terminal only monitors the RAN paging message, and the period for paging monitoring is the RAN paging period.

Understandably, when the terminal detects the RAN paging message once, the terminal stops subsequent monitoring within the PTW.

Understandably, when the terminal detects the CN paging message once, the terminal stops subsequent monitoring within the PTW. For example, when the CN paging message is detected, it means that an abnormality occurs, then it is necessary to stop monitoring, so this situation is added.

Understandably, outside the PTW, the terminal will continue to monitor the CN paging message; a period for monitoring is min {a CN paging period, a cell default paging period} or a CN paging period.

It is worth noting that the case where the terminal only supports the eDRX function in the idle state and does not support the eDRX function in the inactive state may be performed in a condition that may include that the terminal is not enabled with the eDRX in the idle state but is enabled with the eDRX function in the inactive state.

Understandably, the terminal is not enabled with the eDRX function in the idle state, which may include that an NAS does not configure the terminal to use the eDRX in a non-idle state, or the base station does not support the eDRX in the non-idle state.

Understandably, the terminal is enabled with the eDRX in the inactive state, which includes that the base station configures the terminal to use the eDRX function in the inactive state and/or the base station also supports the eDRX function in the inactive state.

Further, the protocol may stipulate that the behavior 3 is an unreasonable scenario.

Behavior 4 where the terminal does not enable the eDRX function in the idle state and does not enable the eDRX function in the inactive state may be as follows.

The terminal will monitor both the CN paging message and the RAN paging message, and there is no PTW at this time.

A period of paging monitoring is min {a CN paging period, an RAN paging period, a cell default paging period}.

It is worth noting that the case where the terminal does not support the eDRX function in the idle state and does not support the eDRX function in the inactive state may be performed in a condition that may include that the terminal is not enabled with the eDRX function in the idle state and is not enabled with the eDRX function in the inactive state.

Understandably, the terminal is not enabled with the eDRX function in the idle state, which includes that an NAS does not configure the terminal to use the eDRX function in the idle state, or the base station does not support the eDRX function in the idle state.

Understandably, the terminal is not enabled with the eDRX function in the inactive state, which may include that the base station does not configure the terminal to use the eDRX function in the inactive state (the base station supports the eDRX function in the inactive state in this case), or the base station does not enable the eDRX function in the inactive state, either.

Embodiments of the present disclosure provide a communication device, which includes: a memory, and a processor connected with the memory. The memory has stored therein an instruction executable by the processor. The processor is configured to execute the terminal control method and/or the information processing method as provided by any of the foregoing technical solutions.

The processor may include various types of storage media, which are non-transitory computer storage media, which are capable of continuing to memorize information stored thereon after the communication device is powered down.

Here, the communication device includes: an access device or a UE or a core network device.

The processor may be connected with the memory through a bus or the like, for reading executable programs stored on the memory, for example, at least one of the methods shown in FIG. 2, FIG. 3 to FIG. 5, FIG. 6A to FIG. 6D, FIG. 7A to FIG. 7B, and/or FIG. 8A to FIG. 8C.

Figures 12, 13:
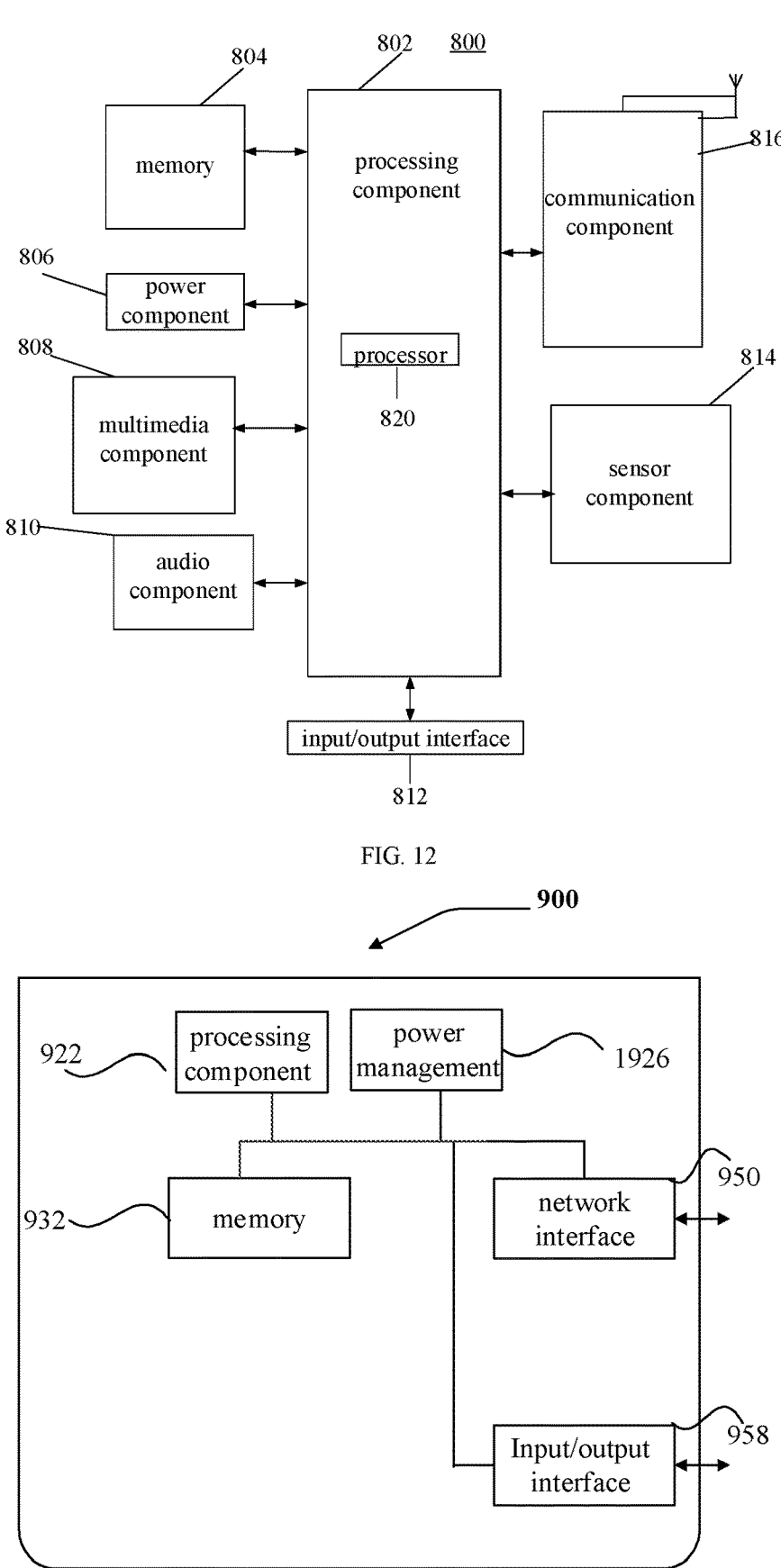
FIG. 12 is a schematic diagram showing a UE, according to an illustrative embodiment.
FIG. 13 is a schematic diagram showing a communication device, according to an illustrative embodiment.

FIG. 12 is a block diagram showing a UE 800 according to an illustrative embodiment. For example, the UE 800 may be a mobile phone, a computer, a digital broadcast user equipment, a messaging device, a game console, a tablet device, a medical device, a fitness device, a personal digital assistant, or the like.

Referring to FIG. 12, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, phone calls, data communications, camera operations, and recording operations. The processing component 802 may include one or more processors 820 to execute instructions to perform all or some of the steps in the above-described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, videos, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the UE 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as keyboards, click wheels, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may further include a light sensor, such as a CMOS or CCD image sensor, for use in imaging applications. In some embodiments, the sensor component 814 may further include an accelerometer sensor, a gyroscope sensor, a magnetic sensor, a pressure sensor, or a temperature sensor.

The communication component 816 is configured to facilitate communication, wired or wireless, between the UE 800 and other devices. The UE 800 can access a wireless network based on a communication standard, such as Wi-Fi, 2G, or 3G, or a combination thereof. In an illustrative embodiment, the communication component 816 receives a broadcast signal or broadcast associated information from an external broadcast management system via a broadcast channel. In an illustrative embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the UE 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned methods.

In an illustrative embodiment, there is also provided a non-transitory computer readable storage medium including instructions, such as included in the memory 804, executable by the processor 820 in the UE 800, for completing the above-mentioned methods. For example, the non-transitory computer-readable storage medium may be a ROM, a random access memory (RAM), a CD-ROM, a magnetic tape, a floppy disc, an optical data storage device, and the like.

As shown in FIG. 13, an embodiment of the present disclosure shows a block diagram of an access device. For example, the communication device 900 may be provided as a network side device. The communication device may be an access device and/or a core network device as described hereinbefore.

Referring to FIG. 13, the communication device 900 includes: a processing component 922, which further includes one or more processors; and a memory resource, represented by a memory 932, for storing instructions executable by the processing component 922, such as an application program. The application programs stored in the memory 932 may include one or more modules. Each module corresponds to a set of instructions. Further, the processing component 922 is configured to execute instructions to perform the methods as described above or any method of the above application program on the access device, such as the method as shown in FIG. 2, FIG. 3 to FIG. 5, FIG. 6A to FIG. 6D, FIG. 7A to FIG. 7B, and/or FIG. 8A to FIG. 8C.

The communication device 900 may also include a power management 926 configured to perform power management of the communication device 900, a wired or wireless network interface 950 configured to connect the communication device 900 to a network, and an input output (I/O) interface 958. The communication device 900 may operate an operating system stored in memory 932, such as Windows Server™, Mac OS X™, Unix™, Linux™, FreeBSD™ or the like.

Other embodiments of the present disclosure will be apparent to those skilled in the art from consideration of the specification and practice of the disclosure disclosed here. This present disclosure is intended to cover any variations, uses, or adaptations of the disclosure following the general principles thereof and including such departures from the present disclosure as come within known or customary practice in the art. It is intended that the specification and embodiments or examples be considered as illustrative only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A terminal control method, performed by a terminal, comprising:
   receiving a first indication carried in a broadcast message, wherein the first indication at least indicates whether an access device supports an extended discontinuous reception (eDRX) function in an inactive state, wherein the broadcast message comprises a system information block (SIB);
   receiving first assistance information transmitted by an access network or a core network, wherein the first assistance information comprises: a second eDRX parameter of an idle state transmitted by the core network;
   determining a first eDRX parameter according to the first assistance information; and
   performing the eDRX function in the inactive state according to the first eDRX parameter.

2. The method according to claim 1, wherein the first assistance information further comprises one of:
   the first eDRX parameter of the inactive state transmitted by the core network;
   the first eDRX parameter of the inactive state transmitted by the access network.

3. The method according to claim 2, wherein the second eDRX parameter comprises at least one of:
   an eDRX period;
   a time domain position indication parameter of a paging time window (PTW),
   or
   wherein the first eDRX parameter at least comprises an eDRX period.

4. The method according to claim 3, wherein the first eDRX parameter further comprises: a time domain position indication parameter of a paging time window (PTW), wherein the time domain position indication parameter of the PTW comprises at least one of:

a starting time domain position of the PTW;
a window length of the PTW.

5. The method according to claim 1, further comprising:
   monitoring a paging channel in the inactive state according to the first eDRX parameter and/or a second eDRX parameter of an idle state.

6. An information processing method, performed by an access device of an access network, comprising:
   transmitting a first indication in a broadcast message carrying the first indication, wherein the first indication indicates whether the access device supports a terminal to start an extended discontinuous reception (eDRX) function in an inactive state,
   wherein the broadcast message comprises a system information block (SIB);
   receiving second assistance information transmitted by a core network;
   determining first assistance information based on the second assistance information;
   transmitting the first assistance information,
   wherein the first assistance information comprises: a second eDRX parameter of an idle state transmitted by the core network, and the first assistance information is configured for the terminal to determine a first eDRX parameter for performing the eDRX function in the inactive state.

7. The method according to claim 6, wherein a precondition that the access network supports the eDRX function in the inactive state comprises:
   the access network supporting an eDRX period of an idle state; and/or
   the access network not supporting the eDRX function in the inactive state, in a case where the access network does not support the eDRX function in the idle state.

8. The method according to claim 6, wherein the first assistance information comprises the first eDRX parameter.

9. The method according to claim 6, wherein the first eDRX parameter at least comprises: an eDRX period.

10. The method according to claim 6, wherein determining the first assistance information based on the second assistance information comprises at least one of:
   determining the first assistance information in response to determining according to the second assistance information that the core network has enabled the eDRX function of the terminal;
   determining the first assistance information in response to determining according to the second assistance information that the core network has configured an eDRX period of the terminal;
   determining the first assistance information in response to determining according to the second assistance information that the core network has configured a time domain indication parameter of a paging time window (PTW) of the terminal.

11. An information processing method, performed by a core network device of a core network, comprising:
   transmitting second assistance information; wherein the second assistance information is configured for an access device to determine first assistance information to be provided by an access network to a terminal, the first assistance information comprises: a second eDRX parameter of an idle state transmitted by the core network, and the first assistance information is configured for the terminal to determine a first eDRX parameter for performing an extended discontinuous reception (eDRX) function in an inactive state.

12. The method according to claim 11, further comprising:

transmitting first assistance information.

13. The method according to claim 11, wherein the second assistance information comprises at least one of:

an enabling indication, indicating that the eDRX function of the terminal has been enabled;

a period configuration, indicating an eDRX period of the terminal;

a paging time window (PTW) configuration, indicating a time domain indication parameter of a PTW of the terminal.

14. The method according to claim 11, further comprising:

receiving the first assistance information returned by the access network based on the second assistance information.

15. A communication device, comprising a processor, a transceiver, a memory, and an executable program stored on the memory and runnable by the processor, wherein the processor is configured to execute the method according to claim 1.

16. A communication device, comprising a processor, a transceiver, a memory, and an executable program stored on the memory and runnable by the processor, wherein the processor is configured to execute the method according to claim 6.

17. A communication device, comprising a processor, a transceiver, a memory, and an executable program stored on the memory and runnable by the processor, wherein the processor is configured to execute the method according to claim 11.

* * * * *